United States Patent [19]
Thomas

[11] Patent Number: 5,720,473
[45] Date of Patent: Feb. 24, 1998

[54] SHOCK ABSORBER

[76] Inventor: James Gregory Thomas, 1007 Pampas Dr. SE., Albuquerque, N. Mex. 87108

[21] Appl. No.: 621,843

[22] Filed: Mar. 26, 1996

[51] Int. Cl.⁶ .................................................. B60G 13/06
[52] U.S. Cl. ........................ 267/221; 188/312; 188/322.22
[58] Field of Search .............................. 188/276, 278, 188/282, 285, 288, 289, 312, 322.17, 322.18, 322.22; 267/34, 64.18, 64.22, 64.25, 136, 221; 280/710, 712

[56] References Cited

U.S. PATENT DOCUMENTS

| | | | |
|---|---|---|---|
| 1,273,059 | 7/1918 | Hild | 188/312 |
| 2,029,829 | 2/1936 | Messier | 188/312 |
| 2,852,247 | 9/1958 | Prescott | 267/64.25 |
| 2,882,039 | 4/1959 | Haumann | 267/221 |
| 2,917,303 | 12/1959 | Vierling | 267/221 |
| 3,215,229 | 11/1965 | Bunnell | 188/312 |
| 3,328,019 | 6/1967 | Wilson | 267/64.16 |
| 3,502,347 | 3/1970 | Busignies | 267/34 |
| 3,967,707 | 7/1976 | Carlton | 188/315 |
| 4,465,166 | 8/1984 | Moore | 188/278 |
| 4,591,033 | 5/1986 | Taylor | 188/322.22 |
| 5,183,285 | 2/1993 | Bianchi | 280/710 |
| 5,477,948 | 12/1995 | Stevens | 267/221 |

*Primary Examiner*—Robert J. Oberleitner
*Assistant Examiner*—Chris Schwartz

[57] ABSTRACT

A shock absorber for a vehicle includes telescoping cylinder and piston assemblies, with the piston assembly including two pistons connected by a piston shaft which passes through a transverse headwall in the cylinder. Fluid flow from one side of the headwall to the other is restricted by ports in the headwall and, in an alternative embodiment, by external flutes in the piston shaft. The piston and cylinder may be spring loaded with an external coil suspension spring, or may be biased toward an extended position by a pressurized internal gas reservoir. The dual piston design of the shock absorber eliminates the need for a separate gas reservoir, either within the shock absorber or external to the shock absorber, while also obtaining an efficiency of design by stabilizing the piston against rocking loads without the need for a separate piston rod seal.

17 Claims, 6 Drawing Sheets

SHOCK ABSORBER

BACKGROUND OF THE INVENTION

1. Field of the Invention

The present invention is generally related to shock absorbers and dampers. More particularly, the invention disclosed and claimed herein is related to shock absorbers and dampers used in bicycles, motorcycles and other vehicles.

2. Description of Related Art Including Information Disclosed Under 37 CFR 1.97 and 1.98

Most modern road vehicles have suspension systems that include suspension springs which operate in combination with liquid-based dampers. The suspension springs bear the weight load of the vehicle while also absorbing road shocks caused by irregularities in the road surface. The dampers operate to damp the normal oscillations of the suspension springs, while also absorbing road shocks to some extent. Dampers and springs are frequently combined in a single unit which is referred to as a shock absorber. However, unsprung dampers are also sometimes referred to as shock absorbers. Consequently it should be understood that in the discussion which follows, the term "shock absorber" is used to refer to either an unsprung damper, or a damper which is spring loaded in some manner.

In some suspension systems the shock absorber is separate from one or more main suspension springs, as for example in a motor vehicle having leaf-type axle springs and conventional telescoping tubular shock absorbers. In other suspension systems, as noted above, the shock absorber consists of a damper and a main suspension spring combined in an integral unit. In motorcycle rear wheel suspension systems, for example, it is common for a telescoping tubular shock absorber to be positioned coaxially inside a coil suspension spring to form a single unit, which achieves an economy of both function and space by enabling both the shock absorber and the spring to be connected to a single pair of attachment points on the motorcycle body and the rear swing arm of the motorcycle. As will be discussed further below, the present invention is particularly applicable to this latter kind of suspension system, and indeed is applicable to motorcycle rear suspension systems in particular.

In the following discussion reference will be made only to a single wheel, suspension spring, and shock absorber; although it will be understood that the same principles may apply to some or all of the wheels of a vehicle having multiple, independent suspension systems.

Most telescoping shock absorbers are based on the simple principle of a telescoping piston-and-cylinder arrangement, in which a piston displaces hydraulic oil from one side of the piston to the other during extension and compression of the piston, which extension and compression are caused, in turn, by normal travel of the suspension system. The flow of hydraulic oil through, or around, the piston is restricted by various kinds of ports, orifices or the like, so as to impart a resistance to rapid movement of the piston relative to the cylinder. In accordance with basic principles of hydraulics, this resistance increases with the speed of piston displacement, while falling to a negligible resistance at low piston displacement speeds. Hence the shock absorber, or damper, offers little or no resistance to low speed suspension travel, while offering substantial resistance to rapid suspension travel. One consequence of this is that the suspension spring, not the shock absorber, bears the wheel weight of the vehicle while at rest or while traveling on a perfectly smooth roadway. Upon the vehicle encountering a pothole or an obstacle, however, the suspension system allows for limited travel of the wheel. The energy, or "road shock," that would normally be transmitted through the wheel to the body of the vehicle is absorbed in part by the suspension spring and in part by the shock absorber. In addition to absorbing part of the road shock, the shock absorber dampens the rebound of the suspension spring.

It has been long recognized that, in the simple arrangement described above, there must be some provision made for avoiding "hydraulic lock." This follows from the fact that in a simple piston-and-cylinder arrangement, in which the cylinder is filled with hydraulic oil, the piston is attached to a piston rod. The piston rod passes through an oil seal at one end of the cylinder. While the piston alone would be free to move up and down the cylinder, displacing hydraulic oil from one side of the piston to the other in the process, the introduction of the attached piston rod complicates this process, due to the fact that the portion of the piston rod inside the oil seal occupies a measurable volume within the cylinder, and this volume varies as the piston rod moves in and out of the cylinder. Upon compression of the piston, the introduction of the rod into the cylinder increases the combined volume of the piston and rod. In the absence of some provision allowing for expansion of the volume available to the oil, the incompressibility of the oil will essentially prevent movement of the piston, resulting in "hydraulic lock." Conversely, extension of the piston relative to the cylinder will result in cavitation of the oil, with loss of the desired damping effect.

This problem has long been solved in one simple manner by providing an air space at the top of the cylinder, above the oil level. The air, being very compressible relative to the oil, expands and contracts in volume with extension and compression of the piston, thereby accommodating the changing volume of the combined piston and piston rod. While this approach is suitable for some applications, it fails in certain high performance applications. In high performance applications the oil and air eventually mix to form an emulsion, which has different performance characteristics than the oil alone. Also, the use of an air reservoir in this manner fundamentally detracts from the performance objective of the shock absorber alone, because the air functions as a spring, resisting compression of the piston.

A related approach to this problem is the use of gas pressurized shock absorbers. In these shock absorbers a pressurized gas, typically nitrogen, is used in place of the air reservoir described above. Pressurized gas is used in order to prevent the hydraulic oil from cavitating. In some cases a separator piston or disk is used to separate the oil from the gas, to prevent formation of the emulsion noted above. However, there are still at least two disadvantages with this approach. First, to avoid making the shock absorber larger than necessary for its essential function, the nitrogen reservoir inside the shock absorber is typically rather small. This results in significant variations in the volume of the pressurized gas as the piston is compressed or extended, which results in turn in a significant variation in the exerted gas pressure as the piston is compressed or extended. This in turn results in a skewing in the performance of the combined shock absorber and suspension spring, as the force exerted as a result of the pressurized gas is both significant and variable. Secondly, as the shock absorber heats up during high performance use, the pressure of the gas increases, resulting in "pumping up" of the gas reservoir and further skewing of the performance of the shock absorber in the manner noted above.

In an attempt to attain a more constant pressure effect from the gas reservoir, and to overcome the problem of "pumping up" of the gas reservoir upon heating of the shock absorber, while also minimizing the size of the shock absorber itself, designers have resorted to the use of external gas reservoirs, which are attached to shock absorbers by means of a pneumatic hose. This allows for the use of a considerably larger pressurized gas reservoir, which exerts a less variable pressure response as the piston is extended or compressed. The disadvantage of such external reservoirs, however, is that they introduce an additional external component, adding to the cost, overall weight, and complexity of the shock absorber system.

Another disadvantage of conventional shock absorbers is that they typically include a piston rod oil seal, through which the piston rod passes, which functions to both seal the internal oil reservoir against leakage and also stabilize the single piston and its associated piston rod against lateral, or rocking, force loads. It will be appreciated that, in order to maintain the piston and cylinder in a coaxial, linear arrangement, the piston rod oil seal must thus perform a structural function, and thus must be sufficiently strong for this function. This function necessarily adds weight to the overall assembly.

Accordingly, it is the object and purpose of the present invention to provide a telescoping, liquid-based, piston-and-cylinder damper that does not require a gas reservoir to accommodate extension and compression of the damper.

It is another object of the present invention to provide a shock absorber that functions exclusively as a damper, without the spring effect normally introduced by air or gas reservoirs inside the shock absorber.

It is yet another object of the present invention to provide a spring loaded shock absorber assembly in which the spring function and damping function are independent of one another.

It is another object of the present invention to meet the foregoing objectives by use of a dual piston shock absorber, in which the two pistons are spaced apart so as to bear rocking loads imposed on the piston assembly, thereby eliminating the need for a separate, structural piston rod oil seal.

SUMMARY OF THE INVENTION

In accordance with the present invention, there is provided a shock absorber which comprises a tubular cylinder and a piston assembly telescopically engaged therewith. The cylinder includes an open first end and a second end. The cylinder further includes a transverse interior headwall having a central bore passing therethrough. The second end of the cylinder includes means for affixing the cylinder to a suspension member of a vehicle, which may be either a fixed frame or body member of the vehicle, or a swing arm, axle, or other movable suspension element of the vehicle.

The piston assembly includes a piston rod having a first end and a second end. The first end of the piston rod includes means for affixing the piston rod to a suspension member of a vehicle. The second end of the piston rod terminates in an outer piston. The outer piston may be either an integral part of the piston rod or may be separately formed and attached to the second end of the piston rod. The piston assembly further includes a piston shaft having first and second ends, the first end of the piston shaft being affixed to the outer piston, and the second end being connected to an inner piston. The inner and outer pistons are thus spaced apart by the piston shaft, and they define a fixed oil reservoir volume between them.

As the inner and outer pistons move back and forth on opposite sides of the headwall, they force hydraulic fluid through ports in the headwall, which are sized to restrict flow of fluid through the headwall and thus result in the desired damping effect. In addition to ports in the headwail, or as a substitutes for the ports in the headwall, the piston shaft may include flutes on its external surface, which similarly allow fluid to pass through the headwall.

The shock absorber will normally include a coil suspension spring, which is contained in compression between a flange on the cylinder and a retaining collar on the piston rod. By use of an adjustable collar which is threaded onto the piston rod, the coil spring may be preloaded to a desired level.

In a preferred embodiment, the shock absorber includes a damping adjuster which adjustably restricts the flow rate of fluid through the headwall. Also, a spring loaded thermal expansion plug may be preferably utilized to accommodate thermal expansion of the hydraulic fluid in the shock absorber.

In an alternative embodiment, the shock absorber includes pressurized gas, which is contained in gas reservoirs formed in the piston rod and in the second end of the cylinder. The two gas reservoirs are connected in fluid communication by a central bore passing through the two pistons and the piston shaft. By pressurizing the gas to a desired level, the shock absorber may be biased toward an extended position, and in addition the shock absorber includes a level of spring loading which is determined by the pressure of the gas in the reservoirs.

These and other features of the present invention will be more fully apparent from the detailed description set forth below, when taken with the accompanying drawings.

BRIEF DESCRIPTION OF THE DRAWINGS

The accompanying drawings, when taken with the detailed description of the invention set forth below, serve to illustrate certain preferred embodiments and the best mode known to the applicant for making and using the present invention. In the drawings.

DESCRIPTION OF THE PREFERRED EMBODIMENTS

Referring to FIGS. 1 through 4, the preferred embodiment of the present invention is illustrated as a spring loaded shock absorber 10. The shock absorber 10 includes a tubular cylinder 12, in which travels a piston assembly 14. The shock absorber 10 further includes a coil suspension spring 16 which drives the piston assembly 14 in extension with respect to the cylinder 12, as discussed further below.

The cylinder 12 includes an integral headwall 12a, which includes a central bore 12b and multiple fluid orifices 12c. Cylinder 12 is open at one end, and is capped with a threaded cylinder cap 18 at its opposite end. Threaded cylinder cap 18 includes an eye 18a for attaching the shock absorber 10 to the body or a suspension member of a vehicle. While the shock absorber 10 may be oriented in either direction, it will normally be oriented in an upright position with the threaded cylinder cap 18 at the upper end, as this is the orientation that would most commonly be used in a motor vehicle. Such an orientation is slightly preferable for the reasons that the piston assembly 14, which will normally be lighter in weight than the cylinder 12, is the moving part; and because the piston seals (discussed below) are less likely to become contaminated with dust.

The piston assembly 14 includes a piston rod 20 which terminates at one end in an integral outer piston 20a, and which terminates at its opposite end in an integral eye 20b, by which the piston assembly 14 may be attached to a vehicle frame member or suspension member.

A piston shaft 22 is threaded into and extends from a central bore 20c in the face of the piston 20a. The piston shaft 22 passes through the central bore 12b in the headwall 12a and is engaged at its end opposite the outer piston 20a with an inner piston 24. The piston rod 20, piston shaft 22, and inner and outer pistons 20a and 24 thus travel as a unit relative to the cylinder 12. More particularly, the pistons 20a and 24 travel as a unit on opposite sides of the headwall 12a. Hydraulic oil 26 is contained in the volume between the pistons 20a and 24, and is forced through the orifices 12c as the piston assembly 14 travels relative to the cylinder 12.

The outer piston 20a includes appropriate oil seals 28, and inner piston 24 likewise includes oil seals 30. The oil seals 28 and 30 may be of any design known in the art, including o-rings, wipers, and various other kinds of seals.

The piston shaft 22 further includes longitudinal flutes 22a formed in its exterior cylindrical surface, which allow hydraulic oil 26 to pass from one side of the headwall 12a to the other, along the flutes 22a, when the shaft 22 is positioned with the flutes 22a located in the bore 12b of the headwall 12a. Size, shape and length of the flutes 22a may be selected to obtain desired performance characteristics which vary progressively with the position of the piston assembly 14 relative to the cylinder 12. For example, the flutes 22a may be tapered outwardly from a center position, so that the damping effect increases with greater displacement of the piston assembly on either side of the center position.

The piston rod 20 further includes exterior threads 20d at its outer end, by which a spring retaining collar 32 is threaded onto the piston rod 20. The suspension spring 16 is thus retained by the retaining collar 32 at one end, and is retained at its opposite end by an integral flange 12d formed in the cylinder 12. The spring 16 can be preloaded in compression to a desired level by screwing the retaining collar 32 inwardly or outwardly along the piston rod 20.

While the spring 16 is generally referred to herein as a suspension spring, which implies that a portion of the overall weight of the vehicle is borne by the spring 16, it should be understood that the spring 16 may in fact be used simply to bias the shock absorber 10 toward an extended position. That is, spring 16 may function to bear little or none of the vehicle weight in some applications.

The end cap 18 includes air vents 18b (FIG. 2), which serve to allow air to freely enter and exit the interior tubular space between the end cap 18 and the inner piston 24. The vents 18b ensure that there is no spring effect arising from compression of air contained in the cylinder 12 during compression of the shock absorber 10.

Figure 1:
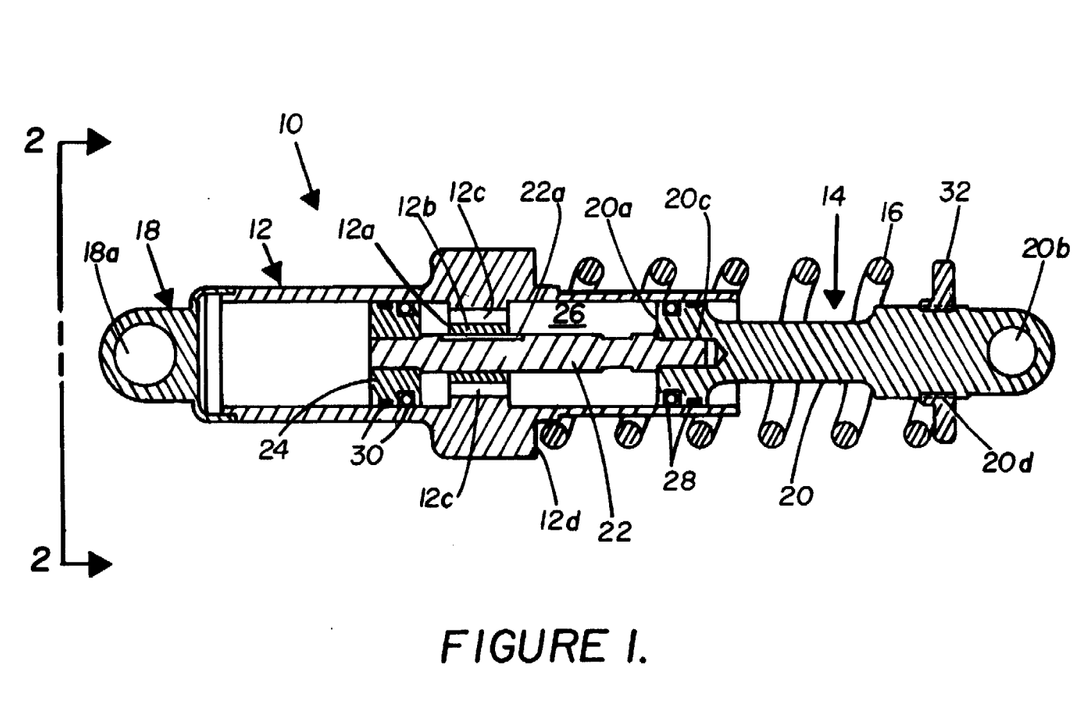
FIG. 1 is a side view in cross section of a preferred embodiment of a shock absorber constructed in accordance with the present invention.
Figure 2:
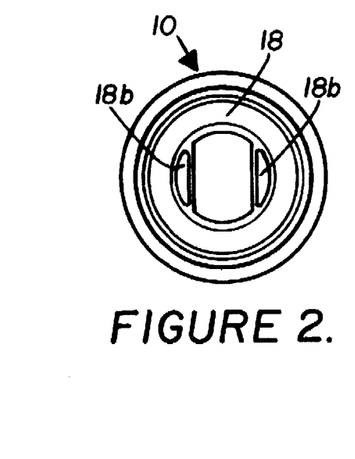
FIG. 2 is an end view of the shock absorber shown in FIG. 1.

It will be noted that the two pistons 20a and 24 operate in an additional role to stabilize the piston assembly 14 against lateral or rotational motion relative to the cylinder 12. This results in an economy of function compared with other previously known shock absorbers having a single piston, in which a separate stabilizing collar is ordinarily necessary to stabilize the piston in the cylinder.

Figure 3:
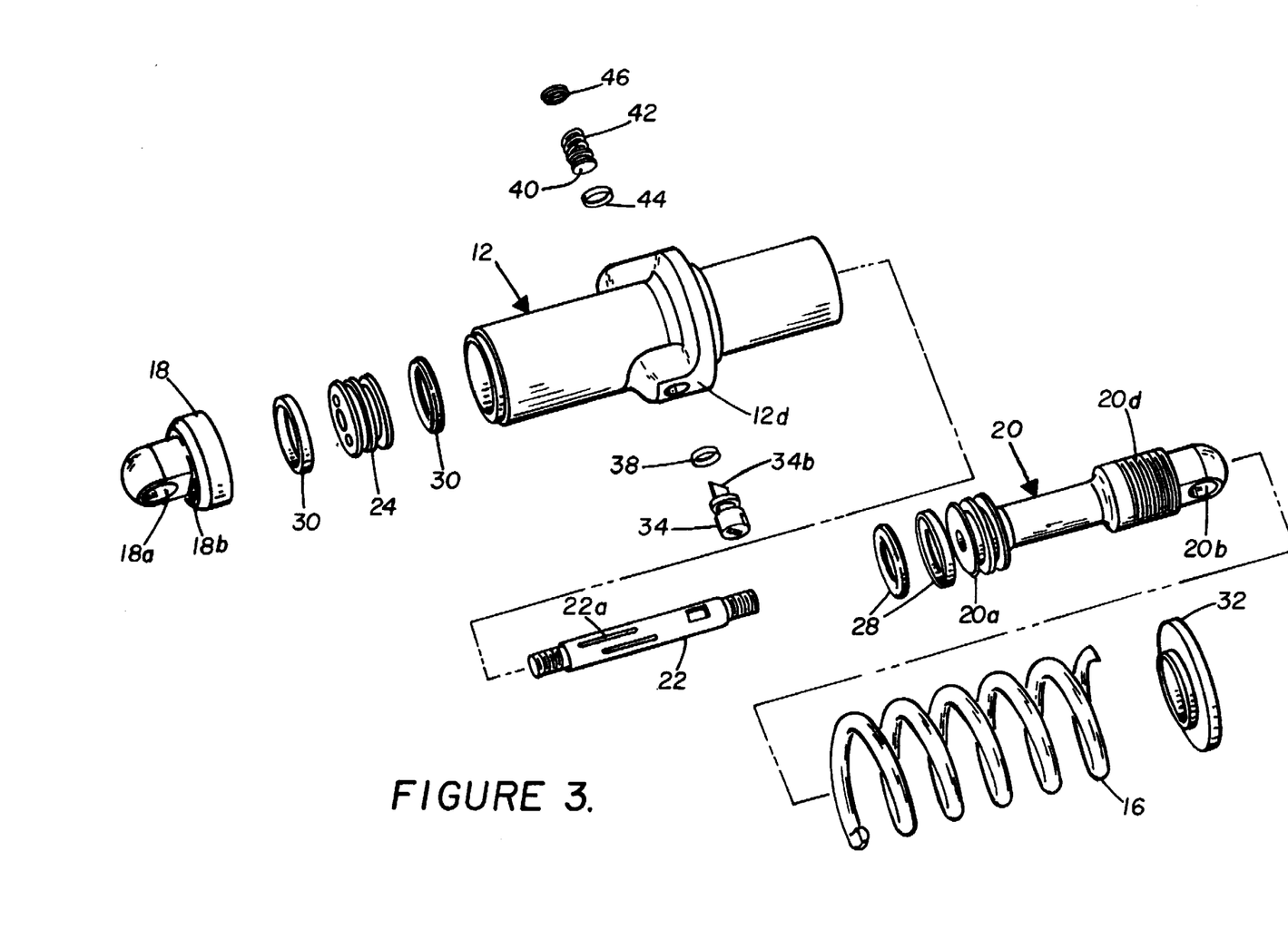
FIG. 3 is an exploded isometric view of the shock absorber of FIG. 1.
Figure 4:
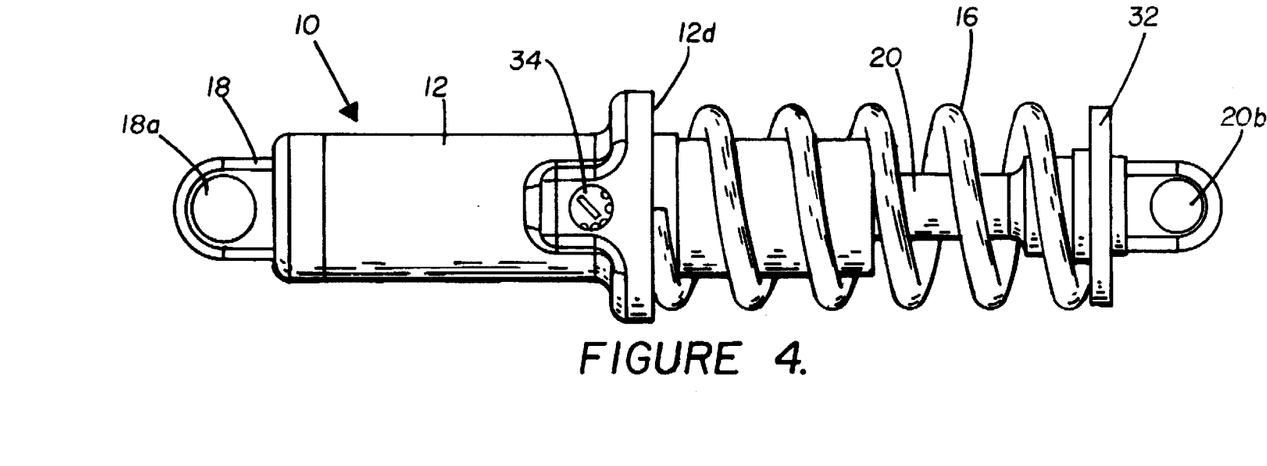
FIG. 4 is a side view of the shock absorber of FIG. 1.
Figure 6:
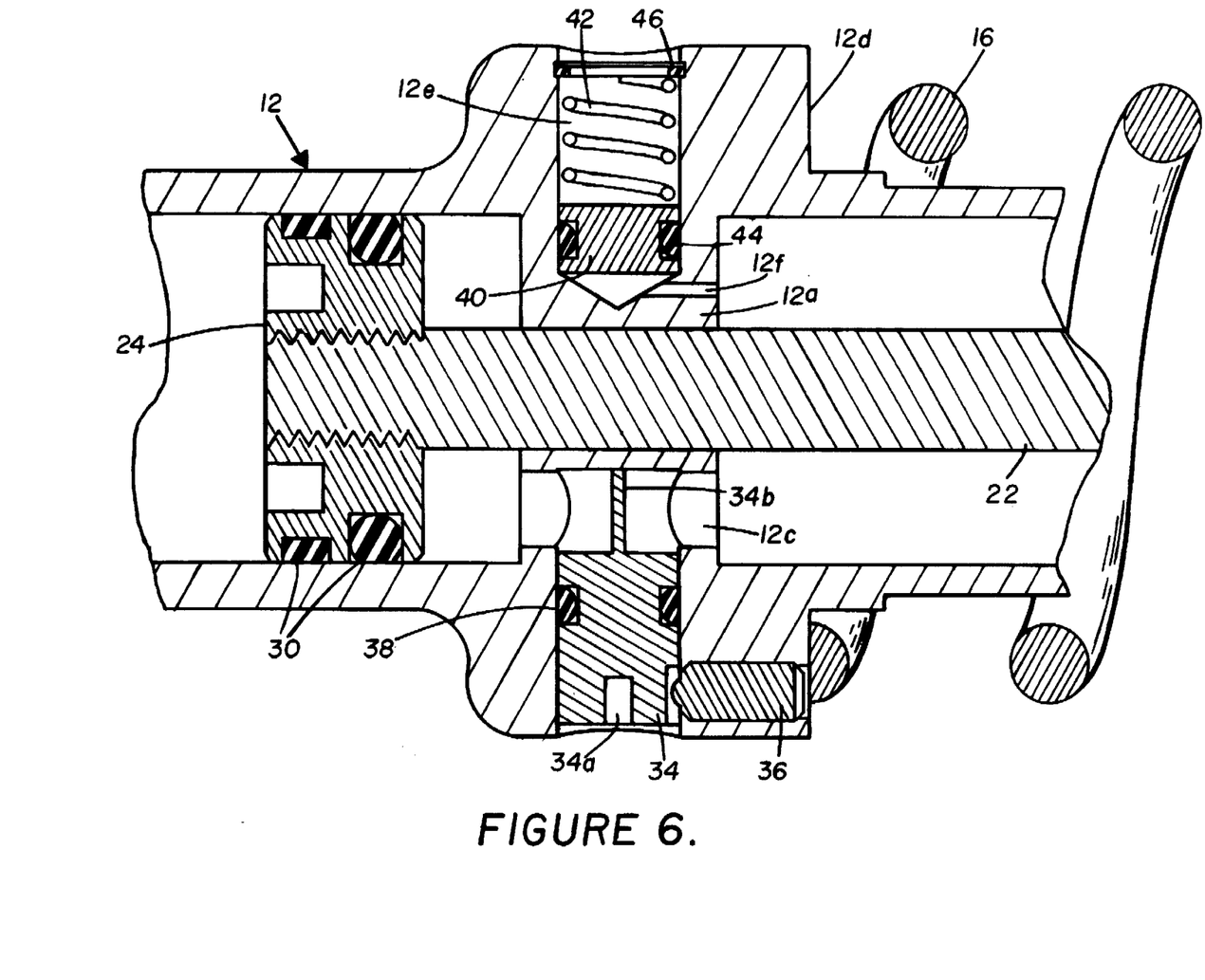
FIG. 6 is an enlarged, partial cross sectional view of the shock absorber of FIG. 1.

FIGS. 3, 4 and 6 show a damping adjuster 34, which protrudes radially through the flange 12d of cylinder 12 into one of the headwall ports 12c. Rotation of the damping adjuster 34 restricts or enlarges the size of the port 12c so as to adjust the damping response of the shock absorber. The damping adjuster 34 protrudes through a bore in the flange 12d and is retained by a set screw 36. The damping adjuster 34 includes an o-ring seal 38 and an adjustment slot 34a. The damping adjuster 34 includes an angled end member 34b which restricts flow of oil through port 12c to varying degrees, depending on the angle of orientation of the end member 34b with respect to the axis of the port 12c.

Figure 5:
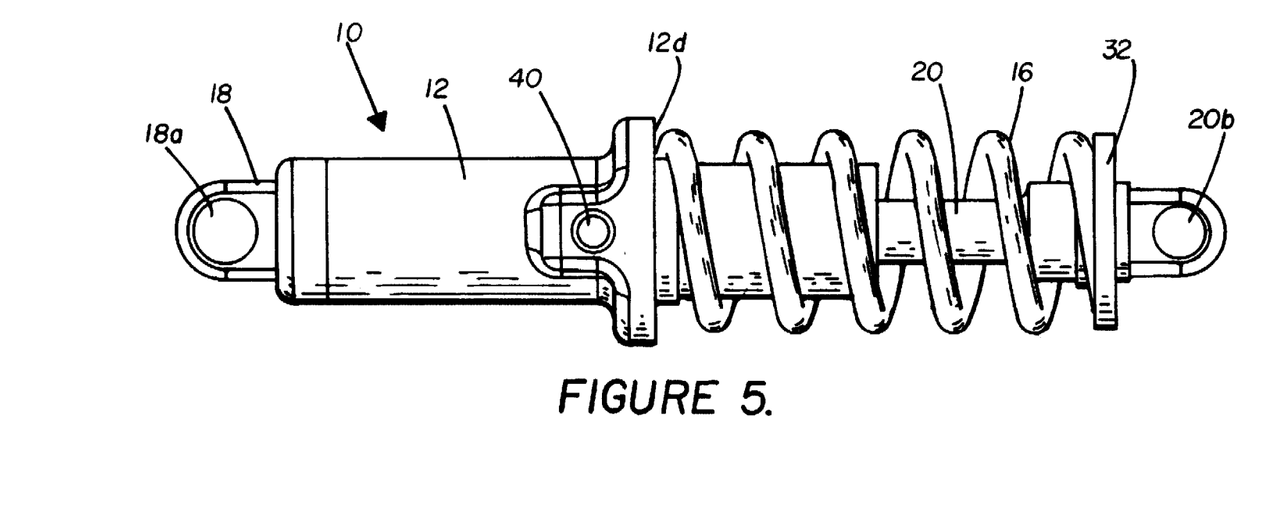
FIG. 5 is another side view of the shock absorber of FIG. 1.

FIGS. 3, 5 and 6 show a thermal expansion plug 40, which is spring loaded by spring 42. The thermal expansion plug 40 allows limited thermal expansion and contraction of the oil 26 in the cylinder 12. It will be appreciated that, because there is no air reservoir communicating with the oil reservoir, as in many convention shock absorbers, it is necessary to have a relief mechanism to accommodate expansion and contraction of the hydraulic oil 26. The expansion plug 40 includes an o-ring seal 44. The spring 42 and plug 40 are retained by a retaining ring 46 in a radial bore 12e in the cylinder flange 12d. An access bore 12f in headwall 12a allows fluid communication between the oil 26 in the cylinder 12 and the thermal expansion plug 40.

Figure 7:
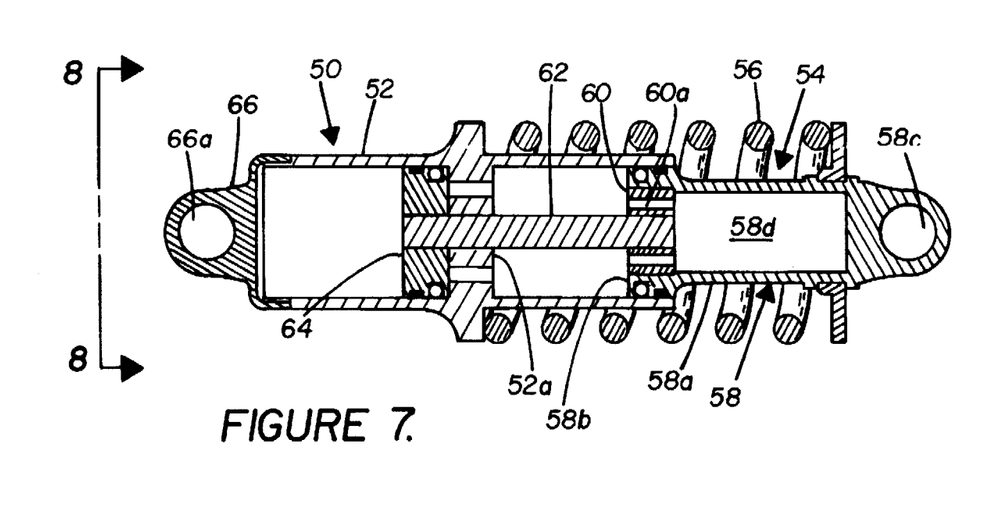
FIG. 7 is a cross sectional side view of another embodiment of a shock absorber constructed in accordance with the present invention.
Figure 8:
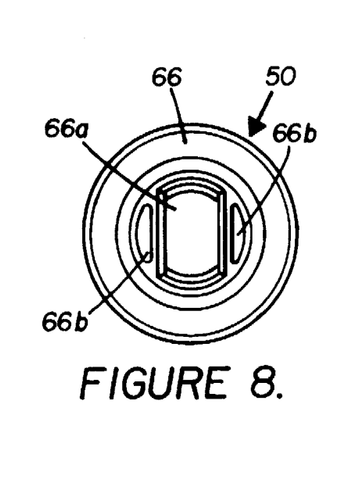
FIG. 8 is an end view of the shock absorber of FIG. 7.

FIGS. 7 and 8 illustrate an alternative embodiment of a shock absorber 50 constructed in accordance with the present invention. Shock absorber 50 includes a cylinder 52, a piston assembly 54 and a suspension spring 56. The piston assembly 54 includes a hollow tubular piston rod 58 which includes a cylindrical tube 58a, an integral outer piston flange 58b at one end and an integral eye 58c at its opposite end. The cylindrical tube 58a is open at its end which includes the outer piston flange 58b. A piston plug 60 is threaded into the open end of the tube 58a, such that the piston flange 58b and the piston plug 60 together form a piston which is comparable in function to the piston 20a described above with respect to the embodiments shown in FIGS. 1 through 6. The hollow tube 58a thus defines an interior bore 58d, in which hydraulic oil resides, as discussed further below.

A piston shaft 62 extends from the face of piston plug 60 and passes through a bore in a headwall 52a of cylinder 52. At the opposite end of piston shaft 62 there is engaged an internal piston 64. A cylinder cap 66 having an eye 66a is threaded onto the end of cylinder 52. The cylinder cap 66 includes vents 66b which allow air to flow in and out of the end of cylinder 52.

Piston plug 60 further includes a pair of bores 60a, which allow hydraulic oil to flow into the hollow bore 58d of piston rod 58. It will thus be seen that the primary feature of shock absorber 50 which is not present in the shock absorber shown in FIGS. 1 through 6 is the substitution of the hollow piston rod 58 for the solid piston rod 20. The hollow piston rod 58 of the embodiment shown in FIGS. 7 and 8 serves to define a supplementary oil reservoir which is in fluid communication with the oil contained in the cylinder 52. Consequently a larger amount of oil can be contained in the shock absorber 50 than in the shock absorber 10.

Figure 9:
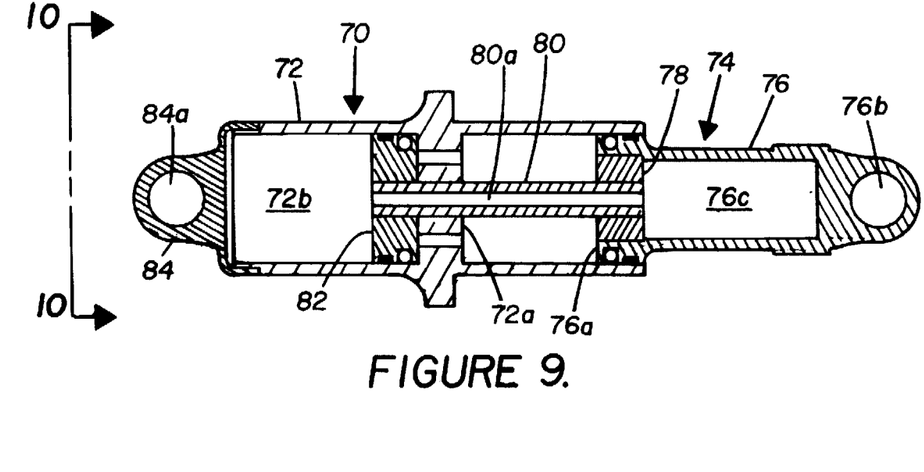
FIG. 9 is a cross sectional side view of another embodiment of a damper constructed in accordance with the present invention.
Figure 10:
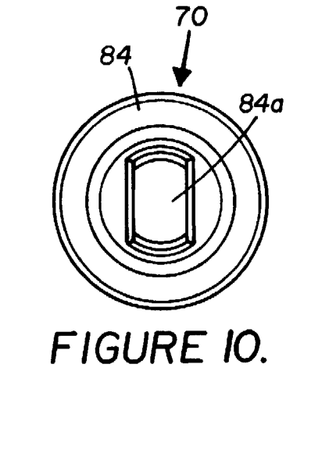
FIG. 10 is an end view of the damper of FIG. 9.

FIGS. 9 and 10 illustrate another preferred embodiment of a shock absorber 70 constructed in accordance with the present invention, in which there is no suspension spring, and in which compressed gas serves to preload the shock absorber 70 toward an extended position. The shock absorber 70 includes a tubular cylinder 72, which is much like the cylinders 12 and 52 of the shock absorbers shown in FIGS. 1 through 8. Shock absorber 70 includes a piston assembly 74, which includes a hollow, cylindrical piston rod 76 that is engaged with a piston plug 78, a piston shaft 80, and an interior piston 82. The piston rod 76 includes an integral piston flange 76a, and an integral eye 76b. The tubular piston rod 76 defines an interior gas reservoir 76c.

The piston shaft 80 has a central bore 80a which extends its entire length and is open at each end. The piston shaft 80 is engaged with the piston plug 78 at one end, passes through a cylinder headwall 72a, and is engaged with the interior piston 82 at its opposite end.

Shock absorber 70 further includes an end cap 84 which includes an integral eye 84a. Unlike the end caps of the embodiments described above and shown in FIGS. 1 through 8, end cap 84 seals the cylinder 72 and thus defines a gas reservoir 72b. It will be seen that the cylinder gas reservoir 72b and the piston gas cylinder 76c are in communication with one another through the piston shaft bore 80a. The combined reservoirs 72b and 76c may be simply be filled with air at ambient atmospheric pressure, or they may be filled with compressed gas, for example nitrogen, at elevated pressures. In either case, it will be seen that telescopic compression of the piston assembly 74 and the cylinder 72 result in a net compression of the gas contained in the shock absorber. Consequently, the shock absorber is normally biased toward an extended configuration by the gas contained therein. Depending on the amount of preload desired by the gas contained in the shock absorber, the gas may be compressed to varying levels of pressure.

Figure 11:
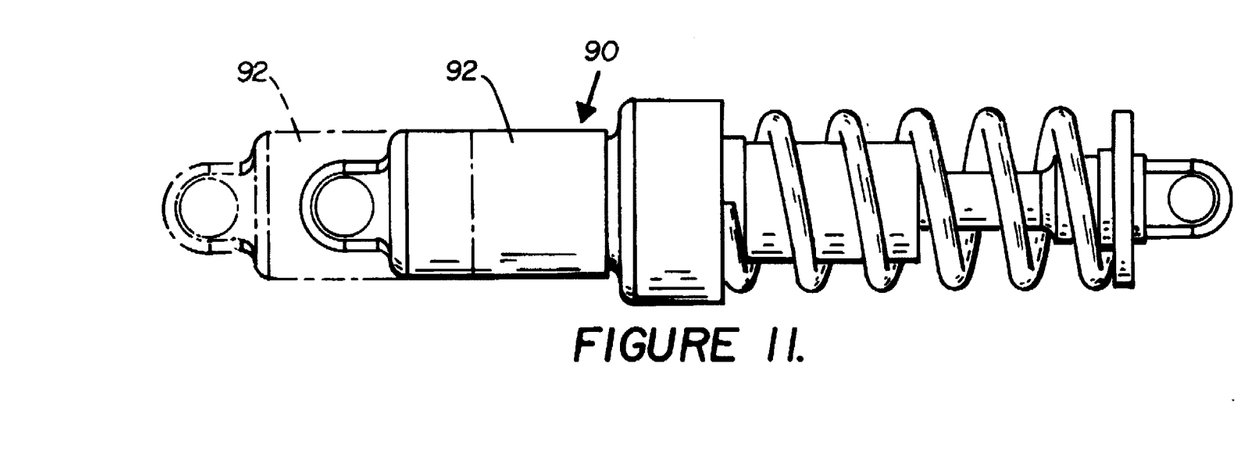
FIG. 11 is a side view of another embodiment of a shock absorber constructed in accordance with the present invention.

FIG. 11 illustrates a shock absorber 90, which may be constructed in accordance with the embodiment shown for example in FIGS. 1 through 6, but with an end cap 92 that is threaded onto a cylinder 94 over an extended threaded portion, such that rotation of the end cap 92 can be used to adjust the ride height of the vehicle supported by the shock absorber 90. The cap 92 is shown in phantom outline in an extended position which represents a position of maximum extension, and is shown in solid outline in a position which represents minimum extension.

Figure 12:
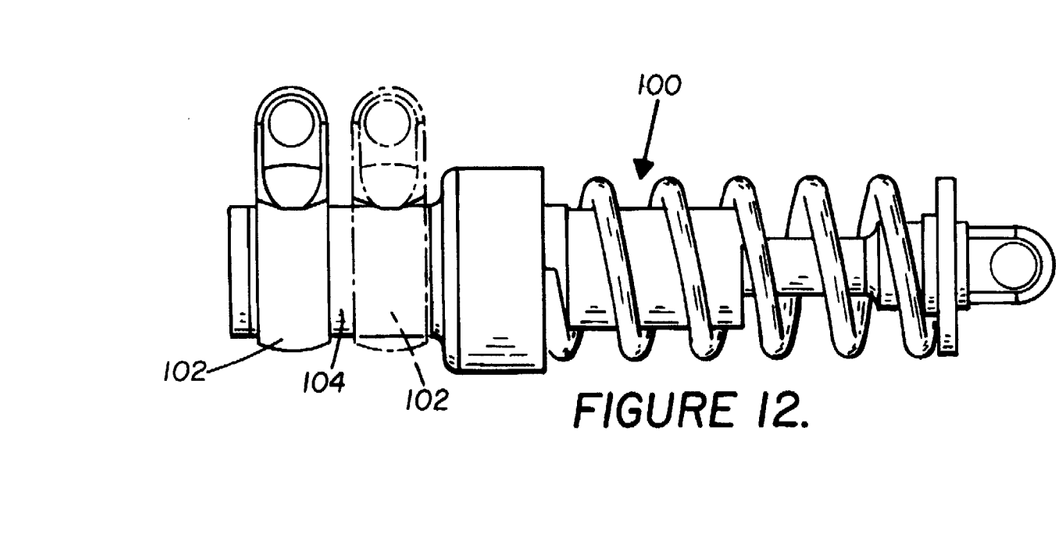
FIG. 12 is a side view of another embodiment of a shock absorber constructed in accordance with the present invention.

FIG. 12 illustrates another embodiment of a shock absorber 100 constructed in accordance with the present invention. Shock absorber may be similar to the shock absorber 10 shown in FIGS. 1 through 6, except that end cap 18 of shock absorber 10 is replaced in shock absorber 100 with mounting clamp 102. Mounting clamp is secured to the outside of cylinder 104, and may be selectively clamped to the cylinder 104 at varying positions along its length to adjust the ride height of the vehicle supported by the shock absorber 100.

The present invention is described above by reference to several preferred embodiments of the invention. However, it will be appreciated that various modifications, substitutions and alterations may be made by one of ordinary skill in the art without departing from the essential invention. Accordingly, the scope of the present invention is defined by the following claims.

The embodiments of the invention in which patent protection is claimed are defined as follows:

1. A shock absorber for a vehicle, comprising:

a tubular cylinder having an open first end and a second end, said cylinder including a transverse interior headwall having a central bore passing therethrough, said second end including means for affixing said second end to a suspension member of a vehicle;

a piston assembly telescopically engaged with said cylinder, said piston assembly including a piston rod having a first end and a second end, said first end of said piston rod assembly including means for affixing said piston assembly to a suspension member of a vehicle, said second end of said piston rod terminating in an outer piston, which closes said open first end of said tubular cylinder said piston assembly further including a piston shaft having first and second ends, said first end of said piston shaft being affixed to said outer piston, said piston shaft extending from said outer piston and passing through said headwall of said cylinder, and said second end of said piston shaft including an inner piston affixed thereto, said inner and outer pistons being spaced apart by said piston shaft and being positioned on opposite sides of said headwall so as to define a reservoir within said cylinder for containing hydraulic fluid on both sides of said headwall; and port means for allowing hydraulic fluid to flow from one side of said headwall to the other at a restricted flow rate;

whereby telescopic compression and extension of said cylinder and said piston assembly are damped by restricted flow of hydraulic fluid from one side of said headwall to the other.

2. The shock absorber defined in claim 1 wherein said port means comprises at least one fluid port passing through said interior headwall of said cylinder.

3. The shock absorber defined in claim 1 wherein said port means includes at least one longitudinal flute formed in the exterior surface of said piston shaft.

4. The shock absorber defined in claim 1 further including a coil suspension spring maintained in compression between said cylinder and said piston assembly.

5. The shock absorber defined in claim 1 wherein said piston shaft includes a central bore, and wherein said piston rod includes an internal gas reservoir, and wherein said second end of said cylinder includes an internal gas reservoir, said internal gas reservoirs in said second end of said cylinder and in said piston rod being connected in fluid communication by said central bore of said piston shaft, whereby pressurized gas may be introduced into said reservoirs to bias the shock absorber toward an extended position and also provide a spring preload into the shock absorber.

6. The shock absorber defined in claim 1 wherein said second end of said cylinder includes a cap threadably engaged with said cylinder, said cap being rotatable to adjust the ride height of the vehicle supported by the shock absorber, and wherein said cap includes a vent to allow air in the second end of said cylinder to enter and exit with telescopic extension and compression of the shock absorber.

7. The shock absorber defined in claim 1 further comprising a coil suspension spring coaxially positioned around said piston rod and said open first end of said cylinder, and wherein said cylinder includes a spring retention flange and said piston rod includes a spring retention collar, said suspension spring being maintained in a compressed state between said flange and said spring retention collar.

8. The shock absorber defined in claim 7 wherein said spring retention collar is threaded onto said piston rod, whereby said suspension spring may be selectively preloaded to a desired level by rotation of said spring retention collar.

9. The shock absorber defined in claim 1 wherein said port means includes oil ports formed in said headwall of said cylinder for enabling flow of hydraulic fluid from one side of said headwall to the other, and further including at least one damping adjuster which protrudes into at least one port, said damping adjuster including flow restriction means operable to selectively and variably restrict flow of fluid through said at least one port, and wherein said damping adjuster extends through said cylinder so as to be actuatable from the exterior of the shock absorber.

10. The shock absorber defined in claim 9 wherein the shock absorber further includes a spring loaded thermal expansion plug located in said cylinder, said thermal expansion plug operating to allow limited expansion of the hydraulic oil in the shock absorber upon heating of the oil.

11. A shock absorber for a vehicle, comprising:

a tubular cylinder having an open first end and a second end, said cylinder including a transverse interior headwall having a central bore passing therethrough, said second end including means for affixing said second end to a suspension member of a vehicle;

a piston assembly telescopically engaged with said cylinder, said piston assembly including a piston rod having a first end and a second end, said first end of said piston rod assembly including means for affixing said piston assembly to a suspension member of a vehicle, said second end of said piston rod terminating in an outer piston which closes said open first end of said tubular cylinder, said piston assembly further including a piston shaft having first and second ends, said first end of said piston shaft being affixed to said outer piston, said piston shaft extending from said outer piston and passing through said headwall of said cylinder, and said second end of said piston shaft including an inner piston affixed thereto, said inner and outer pistons being spaced apart by said piston shaft and being positioned on opposite sides of said headwall so as to define a reservoir within said cylinder for containing hydraulic fluid on both sides of said headwall;

port means for allowing hydraulic fluid to flow from one side of said headwall to the other at a restricted flow rate; and a coil spring positioned coaxially around said first end of said cylinder and around said piston assembly, said coil spring being contained in compression by an integral flange formed on said cylinder and an adjustable retaining collar engaged with said piston rod;

whereby telescopic compression and extension of said cylinder and said piston assembly are damped by restricted flow of hydraulic fluid from one side of said headwall to the other.

12. The shock absorber defined in claim 11 wherein said port means comprises at least one fluid port passing through said interior headwall of said cylinder.

13. The shock absorber defined in claim 11 wherein said port means includes at least one longitudinal flute formed in the exterior surface of said piston shaft.

14. The shock absorber defined in claim 11 wherein said second end of said cylinder includes a cap threadably engaged with said cylinder, said cap being rotatable to adjust the ride height of the vehicle supported by the shock absorber, and wherein said cap includes a vent to allow air in said second end of said cylinder to enter and exit upon telescopic extension and compression of the shock absorber.

15. The shock absorber defined in claim 11 wherein said piston shaft includes a central bore, and wherein said piston rod includes an internal gas reservoir, and wherein said second end of said cylinder includes an internal gas reservoir, said internal gas reservoirs in said second end of said cylinder and in said piston rod being connected in fluid communication by said central bore of said piston shaft, whereby pressurized gas may be introduced into said reservoirs to bias the shock absorber toward an extended position and also provide a spring preload into the shock absorber.

16. The shock absorber defined in claim 11 wherein said port means includes oil ports formed in said headwall of said cylinder for enabling flow of hydraulic fluid from one side of said headwall to the other, and further including at least one damping adjuster which protrudes into at least one port, said damping adjuster including flow restriction means operable to selectively and variably restrict flow of fluid through said at least one port, and wherein said damping adjuster extends through said cylinder so as to be actuatable from the exterior of the shock absorber.

17. The shock absorber defined in claim 11 wherein the shock absorber further includes a spring loaded thermal expansion plug located in said cylinder, said thermal expansion plug operating to allow limited expansion of the hydraulic oil in the shock absorber upon heating of the oil.

* * * * *